US006586730B1

(12) United States Patent
Kamimura et al.

(10) Patent No.: US 6,586,730 B1
(45) Date of Patent: Jul. 1, 2003

(54) PLASMA ION SOURCE MASS SPECTROMETER

(75) Inventors: Seiji Kamimura, Kokubunji (JP); Isamu Takekoshi, Edogawa (JP); Yasushi Terui, Tsuchiura (JP); Yasuaki Takada, Kodaira (JP); Takayuki Nabeshima, Kokubunji (JP); Minoru Sakairi, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/505,428

(22) Filed: Feb. 16, 2000

(30) Foreign Application Priority Data

Feb. 26, 1999 (JP) .......................................... 11-050565
Apr. 9, 1999 (JP) .......................................... 11-102163

(51) Int. Cl.[7] .......................... H01J 49/00; H01J 49/28; B01D 59/44

(52) U.S. Cl. ....................... 250/288; 250/281; 250/282; 250/289; 250/287; 250/294

(58) Field of Search ................................ 250/288, 281, 250/283, 285, 289, 282, 287, 290, 291, 292, 294, 295, 296, 297

(56) References Cited

U.S. PATENT DOCUMENTS

| | | | | | |
|---|---|---|---|---|---|
| 4,745,277 | A | * | 5/1988 | Banar et al. | 250/288 |
| 5,051,557 | A | * | 9/1991 | Satzger | 219/121.52 |
| 5,068,534 | A | * | 11/1991 | Bradshaw et al. | 250/288 |
| 5,514,868 | A | * | 5/1996 | Dixon | 250/282 |
| 5,663,560 | A | * | 9/1997 | Sakairi et al. | 250/281 |
| 5,773,823 | A | * | 6/1998 | Ito et al. | 250/288 |
| 5,939,718 | A | * | 8/1999 | Yamada et al. | 250/288 |
| 6,060,706 | A | * | 5/2000 | Nabeshima et al. | 250/288 |
| 6,157,030 | A | * | 12/2000 | Sakairi et al. | 250/292 |
| 6,295,860 | B1 | * | 10/2001 | Sakairi et al. | 73/23.41 |
| 6,423,965 | B1 | * | 7/2002 | Hashimoto et al. | 250/288 |
| 2001/0042413 | A1 | * | 11/2001 | Sakairi et al. | 73/863.11 |
| 2002/0048818 | A1 | * | 4/2002 | Sakairi et al. | 436/126 |
| 2002/0110490 | A1 | * | 8/2002 | Sakairi et al. | 422/68.1 |

FOREIGN PATENT DOCUMENTS

| | | | | |
|---|---|---|---|---|
| JP | 07078590 | | 3/1995 | |
| JP | 2001084954 A | * | 3/2001 | H01J/49/42 |

* cited by examiner

*Primary Examiner*—John R. Lee
*Assistant Examiner*—Bernard Souw
(74) *Attorney, Agent, or Firm*—Mattingly, Stanger & Malur, P.C.

(57) ABSTRACT

A compact, easy-to-use device is provided which takes in a sample over a shorter distance, the sample introducing time is shortened, and contamination is prevented when the sample is introduced. A burner for generating a plasma, a deflecting portion provided with parallel electrodes for deflecting ions, and an analyzer room for performing mass separation of the deflected ions, these being disposed in a plane in the horizontal direction, and a sample setting portion for setting a sample, a peristaltic pump for aspirating the sample and the burner for introducing and burning the aspirated sample are disposed in a plane in the vertical direction relative to the aforesaid plane. The sample is supplied to the burner from below, and the ions generated by the plasma are made to flow on a horizontal plane.

1 Claim, 15 Drawing Sheets

PLASMA ION SOURCE MASS SPECTROMETER

BACKGROUND OF THE INVENTION

This invention relates to the field of chemical analysis, and in particular to a plasma ion source mass spectrometer.

In the environmental measurement and semiconductor fields, plasma ion source mass spectrometry is being put to practical use as a high sensitivity elemental analysis tool, and its use is rapidly becoming more widespread. As a plasma ion source, an inductively coupled plasma (referred to hereafter as ICP) or a microwave induced plasma (referred to hereafter as MIP) is used, and these sources are combined with a mass spectrometer in commercial devices to measure extremely small quantities of samples.

Japanese Unexamined Patent Publication No. H7-78590 discloses a plasma ion source mass spectrometer comprising a plasma ion source which analyses a sample in a plasma, a sampling interface for leading the generated ions into a vacuum container, an ion optical system disposed in the vacuum container, a mass analyzer and a detector. The axis of the sampling interface and axis of the mass analyzer are disposed at an angle of 90 degrees. The ion optical system comprises a quadrupole type deflector which deflects ions that have passed through the sampling interface by 90 degrees, and the deflector opens onto the opposite side of the sampling interface.

Recently, a quadrupole ion trap mass spectrometer, described simply hereafter as an ion trap mass spectrometer, has been proposed instead of the quadrupole mass spectrometer. The ion trap mass spectrometer is able to accumulate the ions to be measured, which have been led in from outside the mass analyzer into the interior of the mass analyzer surrounding the electrodes, by controlling a high frequency electric field. The accumulated ions are extracted and detected according to m/z (mass/charge ratio).

For this reason, the ion trap mass spectrometer is expected to provide high sensitivity in acquiring mass spectra compared to an ion transmitting type mass spectrometer such as the quadrupole mass spectrometer which transmits ions having a specific m/z in the ions which are introduced. The ion trap mass spectrometer offers the following advantages compared to a transmitting type mass spectrometer such as the conventional quadrupole mass analyzer:

(1) measured ions are retained for a long period inside the apparatus, (2) measured ions are accumulated in large numbers inside the apparatus, (3) a series of measurement operations can be completed in a short time, so mass spectra can be integrated a large number of times within a predetermined time and measurement precision is improved, (4) molecular ions can be dissociated by collisions inside the interior of the mass spectrometer.

Hence, the ion trap mass spectrometer is expected to have new applications in the environmental measurement and semiconductor fields, and as the control portion has been improved, it can now perform more complex control.

SUMMARY OF THE INVENTION

This invention therefore aims to provide a device which incorporates a sample in a shorter distance, shortens introduction time and prevents contamination when a sample is introduced by making better use of the high sensitivity characteristics of an ion trap type mass spectrometer.

This invention further aims to provide a compact device which is easy to use.

This invention is characterized in that an ion generating means used for analysis, ion deflecting means and ion analyzing means are disposed on a plane in a horizontal direction, and a means for supplying a sample to the ion generating means is disposed on a plane in the vertical direction, these means being arranged in a two-tier structure wherein the first is disposed on an upper level and the second is disposed on a lower level.

For convenience of design, although these means are disposed in planes, is not necessary that they be disposed in one plane, it being sufficient that they are disposed in planes in proximity to each other. In practice, the device can be made more compact by adopting a two-tier, two plane construction.

In a burner which generates a plasma, containers housing a torch and a nebulizer can be freely attached or detached, and a pump is provided in its lower part for sample induction that allows a sample to be supplied from outside the control portion and enhances ease of use. By making the burner independent, safety is improved compared to the conventional case. According to this invention, safety is still further enhanced by adopting a three cover structure comprising an outer cover to prevent plasma from affecting the outside environment, a maintenance cover and a burner cover.

Another feature of this invention is that, apart from the fact that the burner is an independent container, an ion deflecting portion and ion analyzing portion form a block inside one container, and the ion introducing portion between the burner and deflecting portion also forms a block in one container, these being arranged inside a basis to form a two-tier/two plane construction.

Further, by arranging plural matching boxes (construction units housing electrical circuits) inside the excess space, the block construction is developed further.

This invention specifically provides the following devices.

This invention provides a plasma ion source mass spectrometer wherein a sample is converted to ions in a plasma, the ions are deflected to give a mass separation, and the masses of the deflected ions are computed to identify ion species, wherein:

a burner for generating the plasma, a deflecting portion comprising electrodes for deflecting the ions, and an analyzer for separating the deflected ions according to mass, these being disposed in a plane in the horizontal direction, and a sample setting portion for setting the sample, a peristaltic pump for aspirating the sample and the burner which introduces and burns the aspirated sample are disposed in a plane in the vertical direction relative to the aforesaid plane. The sample is supplied to the burner from below, and the ions generated by the plasma are made to flow in a horizontal plane.

This invention further provides a plasma ion source mass spectrometer wherein a sample is converted to ions in a plasma, the ions are deflected to give a mass separation, and the masses of the detected ions are computed to identify ion species, wherein:

a burner box comprising a torch and nebulizer, a deflector and analyzer box comprising deflecting electrodes for deflecting ions and an analyzer for separating the deflected ions according to mass, a disk-shaped interface portion comprising an aperture in its center disposed between the burner box and deflecting electrodes, and a slide valve box, these elements being disposed in a plane in the horizontal direction, and in a basis housing these containers, the burner box slides in and out of the interface portion, an opened part is formed for controlling the burner box, and a door is opened in this opened part.

This invention further provides a plasma ion source mass spectrometer wherein a sample is converted to ions in a plasma, the ions are deflected to give a mass separation, and the masses of the detected ions are computed to identify ion species, wherein:

a basis is formed of two layers, and a container forming a burner comprising a torch and nebulizer, a container forming an analyzer room comprising deflecting electrodes for deflecting ions and a deflected ion mass separating portion, and a container comprising a slide valve disposed between the burner and the deflecting electrodes, are disposed in a horizontal direction in the upper layer, and a sample supply source, and a peristaltic pump for aspirating the sample and supplying it to the nebulizer of the burner, are disposed underneath the burner in the lower layer, the sample being introduced to the basis from the lower layer.

This invention further provides a plasma ion source mass spectrometer wherein a sample is converted to ions in a plasma, the ions are deflected to give a mass separation, and the masses of the deflected ions are computed to identify ion species, wherein:

a basis is formed of two layers, wherein a container forming a burner comprising a torch and nebulizer is disposed in the upper layer, a peristaltic pump for aspirating the sample and supplying it to the nebulizer of the burner is disposed in the lower layer, and in the upper layer of the basis, an opened part is formed in the container forming the burner to check the combustion state, doors are provided to seal the opened part, and a check window is formed in these doors.

This invention further provides a plasma ion source mass spectrometer wherein the doors comprise a door in which the check window is formed, and a maintenance door.

This invention further provides a plasma ion source mass spectrometer wherein part of the peristaltic pump is disposed inside the basis, part is disposed outside the basis, and the pump is provided in a pump opening formed in the basis.

This invention further provides a plasma ion source mass spectrometer wherein a matching box is disposed underneath and at the side of the burner box.

This invention further provides a plasma ion source mass spectrometer wherein a container comprising electrodes for deflecting ions and an analyzer room comprising a deflected ion mass separating portion, and a container comprising a slide valve disposed between a burner and the deflecting electrodes, are disposed in the horizontal direction of a container forming the burner, and are supported by a matching box.

This invention further provides a plasma ion source mass spectrometer wherein the burner is disposed on a control side, the analyzer room is disposed to the rear, and the burner and peristaltic pump are disposed in proximity to each other.

This invention further provides a plasma ion source mass spectrometer wherein the container forming the burner is open on its control side and upper side, and a chimney is formed in the basis.

This invention further provides a plasma ion source mass spectrometer comprising a plasma ion source for converting a sample to ions in a plasma, and a mass analyzer for analyzing the sample ions generated by the plasma ion source, wherein:

an introducing path for a sample which has passed via a setting portion for setting the sample, a burner for generating the plasma, an interface portion for introducing ions into a vacuum portion, an ion optics for enhancing ion transmission efficiency in the vacuum portion, and deflecting electrodes for deflecting ions to reach the mass analyzer, has two bends.

This invention further provides a plasma ion source mass spectrometer comprising a plasma ion source for converting a sample to ions in a plasma, and a mass analyzer for analyzing sample ions generated by the plasma ion source, further comprising:

a sample setting portion for setting the sample, a burner for generating the plasma, an interface portion for introducing ions into the vacuum portion, an ion optics for enhancing ion transmission efficiency in the vacuum portion, and deflecting electrodes for deflecting the ions, wherein the sample setting portion and burner are arranged in the height direction, the burner, interface portion, ion optics and deflecting electrodes are arranged in a horizontal direction, and the deflecting electrodes and mass analyzer are arranged in a vertical direction.

This invention further provides a plasma ion source mass spectrometer comprising a plasma ion source for converting a sample to ions in a plasma, and a mass analyzer for analyzing sample ions generated by the plasma ion source, comprising:

a sample setting portion for setting the sample, a burner for generating the plasma, the interface portion for introducing ions into the vacuum portion, an ion optics for enhancing ion transmission efficiency in the vacuum portion, and deflecting electrodes for deflecting the ions, wherein the sample setting portion and burner are arranged in the height direction, the burner, interface portion, ion optics and deflecting electrodes are arranged in a horizontal direction, and the deflecting electrodes and mass analyzer are arranged in the height direction.

This invention further provides a plasma ion source mass spectrometer comprising a plasma ion source for converting a sample to ions in a plasma, and a mass analyzer for analyzing sample ions generated by the plasma ion source, comprising:

a sample setting portion for setting the sample, a burner for generating the plasma, an interface portion for introducing ions into the vacuum portion, an ion optics for enhancing ion transmission efficiency in the vacuum portion, and deflecting electrodes for deflecting the ions, wherein the sample setting portion, burner, interface portion, ion optics and deflecting electrodes are arranged in the height direction.

This invention further provides a plasma ion source mass spectrometer comprising a plasma ion source for converting a sample to ions in a plasma, and a mass analyzer for analyzing sample ions generated by the plasma ion source, comprising:

a sample setting portion for setting the sample, a burner for generating the plasma, an interface portion for introducing ions into the vacuum portion, an ion optics for enhancing ion transmission efficiency in the vacuum portion, and deflecting electrodes for deflecting the ions, wherein

- the sample setting portion and burner are arranged in a first direction,
- the burner, interface portion, ion optics and deflecting electrodes are arranged in a second direction,
- and the deflecting electrodes and mass analyzer are arranged in a third direction different from the aforesaid first and second directions.

This invention further provides a plasma ion source mass spectrometer comprising a plasma ion source for converting a sample to ions in a plasma, and a mass analyzer for analyzing sample ions generated by the plasma ion source, comprising:

- a sample setting portion for setting the sample, a burner for generating the plasma, an interface portion for introducing ions into the vacuum portion, an ion optics for enhancing ion transmission efficiency in the vacuum portion, and deflecting electrodes for deflecting the ions, wherein
- the sample setting portion and burner are arranged in a first direction, and
- the burner, interface portion, ion optics and deflecting electrodes are arranged in a second direction, and
- the deflecting electrodes and mass analyzer are arranged in the aforesaid first direction.

This invention further provides a plasma ion source mass spectrometer comprising a plasma ion source for converting a sample to ions in a plasma, and a mass analyzer for analyzing sample ions generated by the plasma ion source, comprising:

- a sample setting portion for setting the sample, a burner for generating the plasma, an interface portion for introducing ions into the vacuum portion, an ion optics for enhancing ion transmission efficiency in the vacuum portion, and deflecting electrodes for deflecting the ions, wherein
- the sample setting portion, burner, interface portion, ion optics and deflecting electrodes are arranged in a desired direction.

DETAILED DESCRIPTION OF THE PREFERRED EMBODIMENTS

Hereafter, some embodiments of this invention will be described based on the drawings.

Embodiment 1

Figure 1:
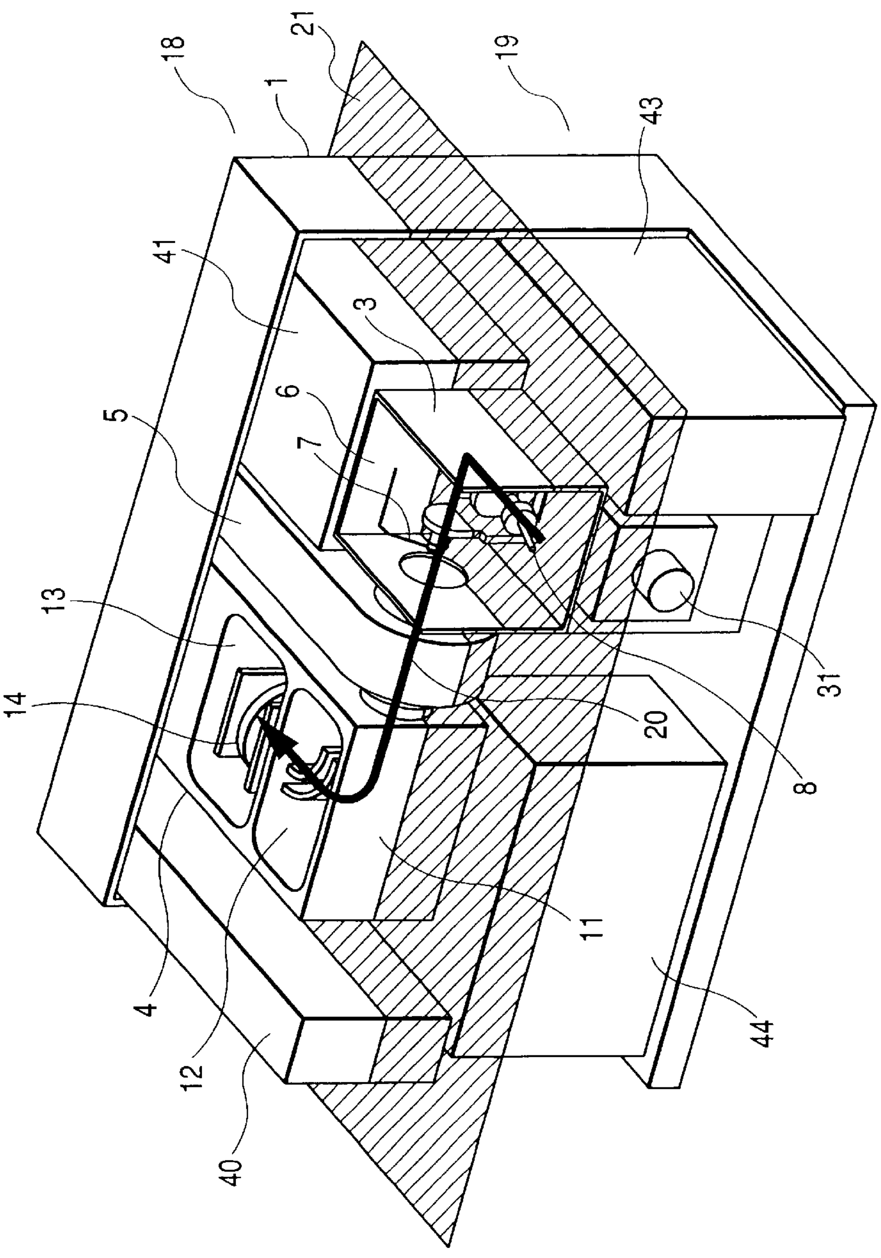
FIG. 1 is a schematic view centered on a horizontal plane according to a first embodiment of this invention.
Figure 2:
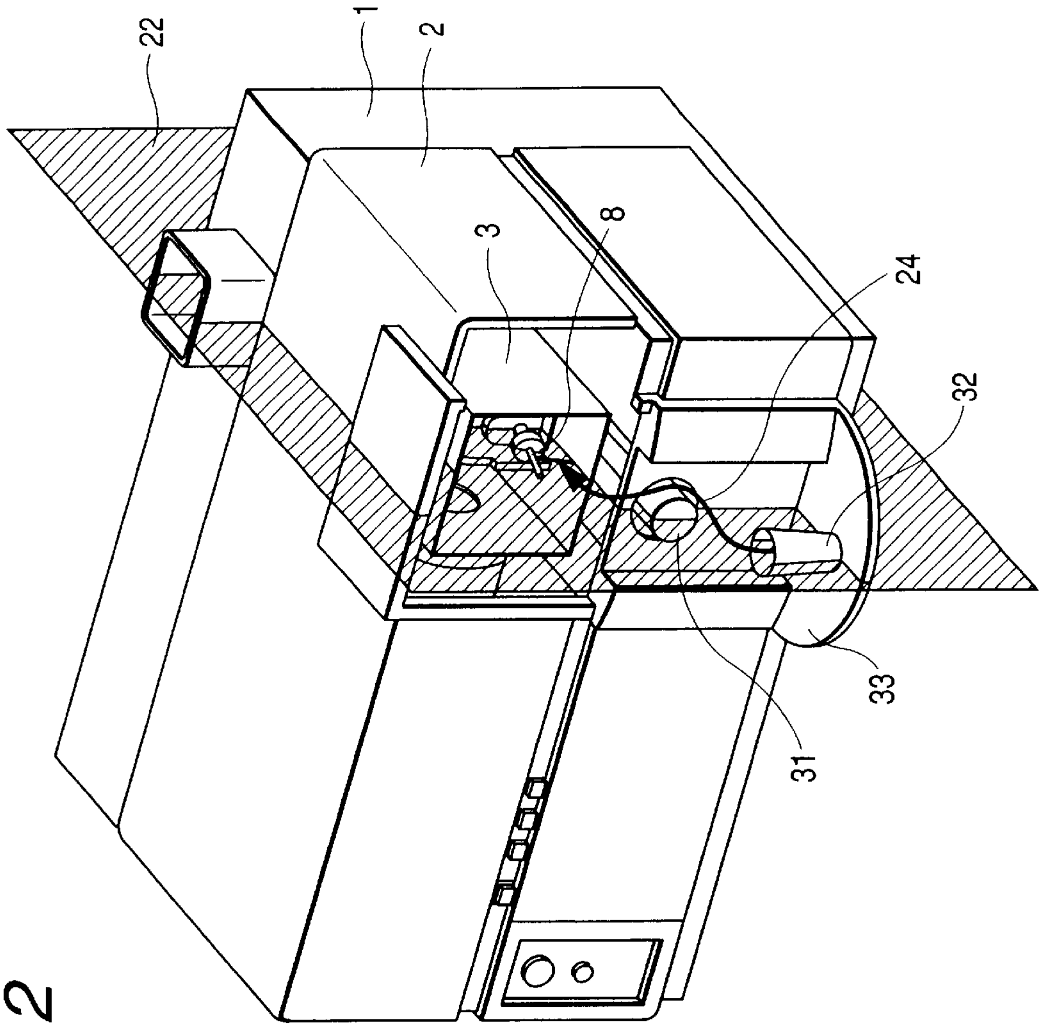
FIG. 2 is a schematic view centered on a vertical plane according to the first embodiment of this invention.

FIG. 1 and FIG. 2 show the first embodiment of this invention.

FIG. 1 is a schematic view of a transverse cross-section of the device showing the arrangement of each part and structural unit.

FIG. 2 is a schematic view in a longitudinal direction through the device showing the arrangement of each part and structural unit.

A plasma ion source mass spectrometer comprises a basis body comprising an L-shaped basis 1 and a front cover 2. The interior of the basis body comprises an upper layer 18 and a lower layer 19, and a burner box 3, slide valve box 5 and deflector/analyzer box 4 are arranged in a row in a horizontal plane 21 from the right-hand side in the upper layer 18.

As shown in FIG. 2, the burner box 3, a peristaltic pump 31 and a sample portion comprising a sample vessel 32 and a tray 33 are arranged in a row in a vertical plane 22 on the right-hand side of the basis body. These parts will now be described in further detail using the schematic view of parts of FIG. 3.

The basis body comprises the L-shaped basis 1 and the front cover 2, and the burner box 3 is equipped with a torch 7 and a nebulizer 8. The deflector and analyzer box 4 has two chambers which are interconnected. Parallel electrodes 12 are disposed in one of these deflector chambers, and an analyzer 14 is disposed in an analyzer room 13, which is the other deflector chamber. A slide valve box 5 is disposed between the burner box 3, and the deflector and analyzer box 4.

Matching boxes 40, 41, a detector portion 42 and an RF power supply portion 43 are mounted on an electronics 44, or they are secured from the side inside the basis body. In this case, positions are determined by the use of the matching boxes, as described above.

The burner box 3 is open on the front and upper sides, and a window 10 fitted with a torch 7 is formed on the side of the slide valve box 5.

A chimney 45 is formed in the L-shaped basis 1 with its upper end open, and burner waste gas is discharged outside from this chimney 45.

An opened part 15 is formed in the front cover 2 in line with a front opening of the burner box 3, and an opening 34 for a pump is formed directly underneath. The peristaltic pump 31 is installed in this opening 34 for a pump.

A shield wall 16 is provided on the upper side of the opening 15, and a shield wall 17 is provided on its lower side straddling the opening 34 for a pump.

A left side door 51 and a right side door 53 are formed in the opened part 15, and a check window 52 is formed in the larger left side door 51.

Figure 7:
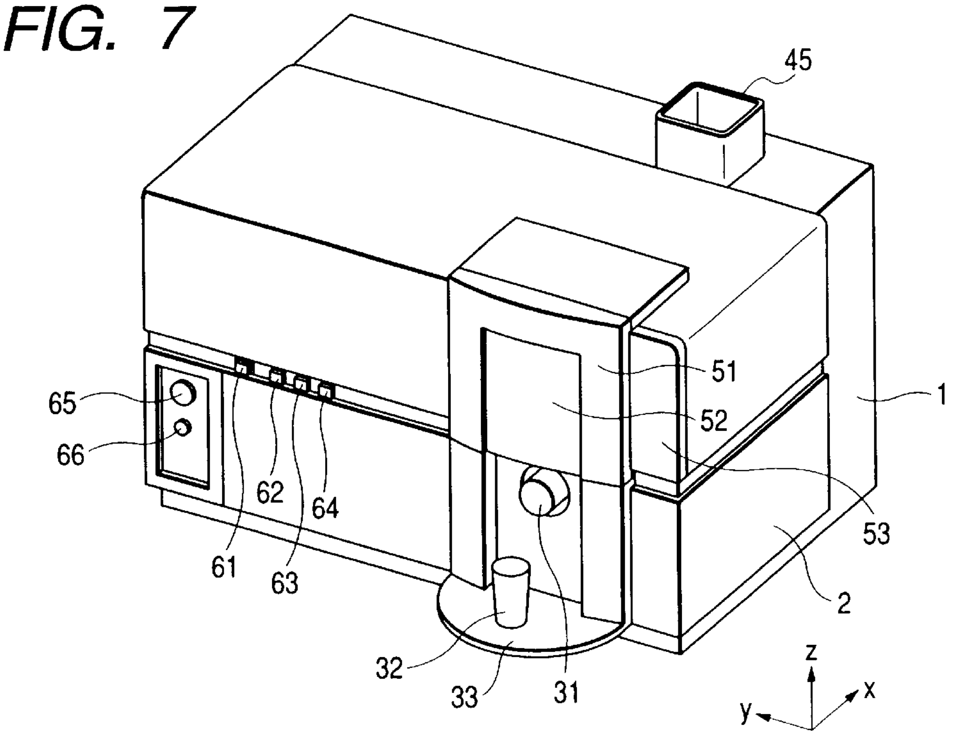
FIG. 7 is an external view of the embodiment.

A gas meter 65 and a gas adjusting dial 66 described in FIG. 7 are formed on the front side of the electronics 44, and a panel 54 which covers them is attached.

A tray 33 is formed underneath the opening 34 for a pump, and a sample vessel 32 is placed on this. In FIG. 2, the peristaltic pump 31 aspirates a sample immediately above the sample vessel 32 via an inner tube, and supplies it to a nebulizer 8. In FIG. 1, the sample supplied to the nebulizer 8 is introduced into a plasma generated by the torch 7, and is ionized by the thermal action of the plasma. The ionized sample is sent to the slide valve box 5 via the interface portion 23 comprising a sampling cone, a differential pumping region and a skimmer cone, not shown. A slide valve is installed in the slide valve box 5, this valve being driven according to the running state of the device.

That is, when an analysis is performed, the slide valve is opened, and a sample ion is sent to the parallel electrodes 12 via the slide valve box 5. Here, it is deflected, and sent to the analyzer room 13.

Therefore, the flow of sample is as shown by the thick lines 24, 20 in FIGS. 1 and 2. That is, the sample flows on two surfaces along the vertical plane 22 and the horizontal plane 21.

The interface portion tends to be contaminated, and it must always be kept clean to maintain analytical precision. When the interface portion 23 or an electrostatic lens, not shown, provided along the interface portion 23, is cleaned, the slide valve is closed, and the operation is performed after suspending the vacuum pump, not shown, which exhausts the differential pumping region. As the slide valve is a pressure wall, evacuation of the deflector and analyzer box 4 can be continued even during cleaning, which decreases the re-starting time of the device after cleaning.

The sample ion introduced into the deflector and analyzer box 4 is deflected by the parallel electrodes 12. If photons from the plasma reach a detecting element, they will be detected as noise which reduces the detection sensitivity of the device. For this reason, the ion orbit is deflected by applying a predetermined voltage to the electrodes of the parallel electrodes 12, and the ion orbit is thereby separated from the photon orbit which is not affected by the electric field. Then, the ions are accumulated for a fixed time by the analyzer 14, and mass analysis is carried out by controlling a high frequency electric field.

In order to accumulate the ions, a light gas such as helium or hydrogen is introduced into the analyzer 14. The details of this ion trap mass spectrometer are well known in the art, and further description is not required.

Figure 4:
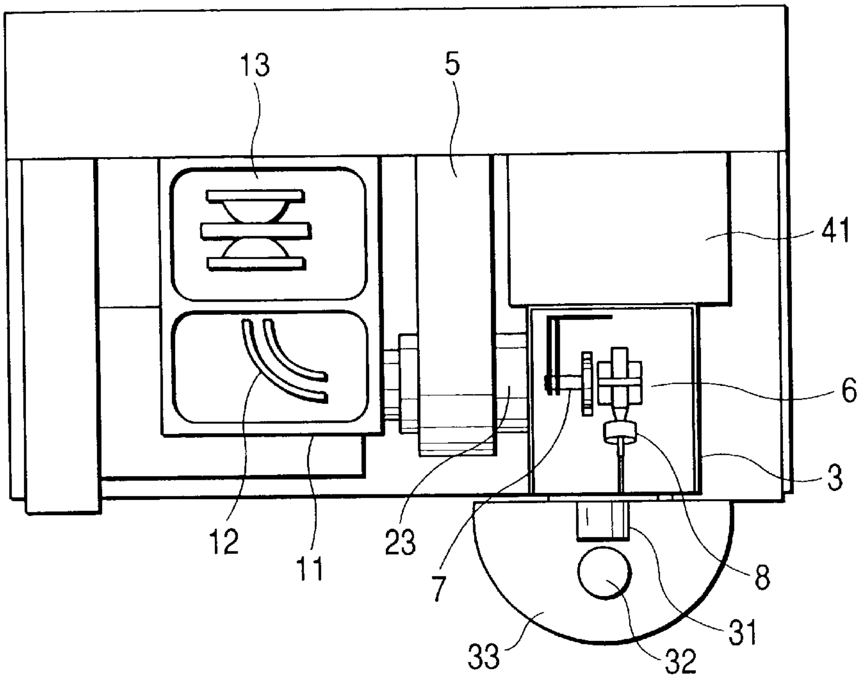
FIG. 4 is a planar arrangement of the embodiment.
Figure 5:
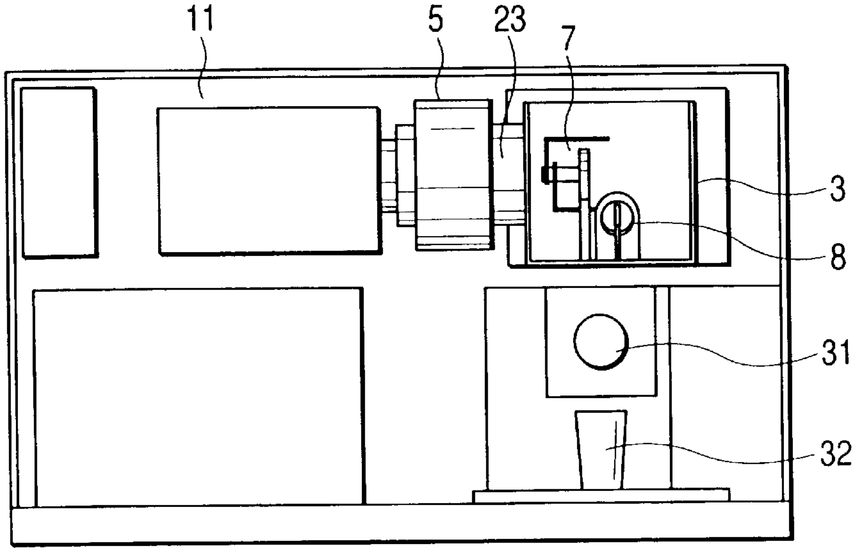
FIG. 5 is a front view of the embodiment.
Figure 6:
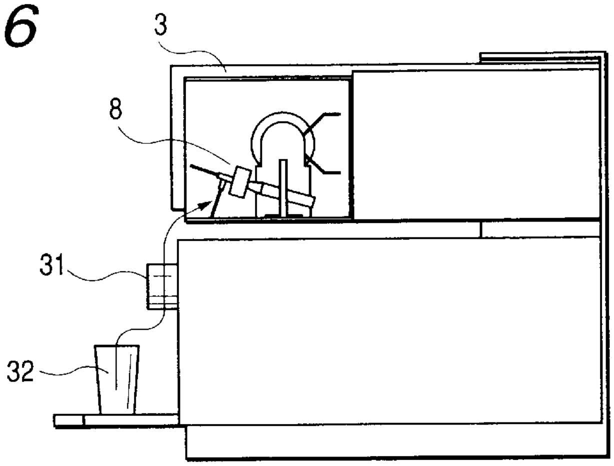
FIG. 6 is a side view of the embodiment.

FIG. 4 is a planar arrangement view of the embodiment, FIG. 5 is a front view of the embodiment, and FIG. 6 is a side view of the embodiment.

The burner 6 which generates the plasma, the deflecting portion 11 equipped with the deflector electrodes (parallel electrodes 12) which deflect the ions, and the analyzer room 13 for performing a mass separation of the deflected ions, are disposed in a plane in the horizontal direction. Sample setting portions such as the tray 33 which sets the sample used as ion source, the peristaltic pump 31 which aspirates the sample, and the burner 6 which inducts and burns the aspirated sample, are disposed in a plane in the vertical direction relative to the aforesaid plane.

In this way, the sample is supplied from underneath to the burner 6 above, and ions generated by the plasma are made to flow on a horizontal plane.

The generated ions reach the slide valve via the interface portion 23, which is a disk-like metal part having an aperture in the center placed alongside the torch 7.

The burner box 3 comprising the torch 7 and nebulizer 8, the deflector and analyzer box 4 comprising deflector electrodes for deflecting the ions (e.g., the parallel electrodes 12), and the analyzer room 13 for mass separation of the deflected ions (including the case when this is a separate structure), the interface portion disposed between the burner box 3 and deflector electrodes and the slide valve box 5, are disposed in a plane in the horizontal direction. The opened part 15 for observing the combustion state, and for sliding the interface portion in and out to and from the control side, is formed in the basis housing these parts, this opened part being sealed by a left-hand door 51 and right-hand door 53 allowing the combustion state to be verified via the check window 52.

By using a horizontal arrangement from the deflected portion to the burner 6, and a vertical arrangement from the sample setting part to the burner 6, parts which are not normally controlled such as the analyzer room 13, deflection portion 11 and slide valve box 5 are disposed horizontally and stabilized. On the other hand, the burner 6, peristaltic pump 31 and sample vessel 32 are parts which must be accessed once or twice during analysis, and they are therefore grouped together in a vertical arrangement which permits easy access.

Further, by separating structural parts respectively in a horizontal arrangement and a vertical arrangement according to their function, the dimension of the basis in a horizontal direction can be reduced.

Therefore, when the device of this embodiment is used on a mounting platform, a mounting platform having a smaller width than in the prior art can be used, and space utilization efficiency is improved in a room where the device of this embodiment is used.

Further, if a standard mounting platform is used, extra space becomes available in the horizontal direction of the device of this invention, so peripheral instruments can be installed as described later.

The operator places the sample vessel 32 on the tray 33, introduces a tube, and fixes the tube to the peristaltic pump 31.

Due to this vertical arrangement, operations may be performed and the combustion state can also be observed from the check window 52 without the operator having to move.

Hence, parts which the operator has to access and positions which require special attention are grouped together, which is an advantage from the viewpoint of control.

In other words, by disposing the burner box (check window 52), peristaltic pump 31 and sample setting portion (tray 33) vertically together, the operator can perform operations at one point without changing his position. Moreover he can grasp the overall situation easily by focusing on these three components.

The check window 52 allows observation at a natural visual angle from any position, and facilitates pump operations such as removing tubes or locking tubes.

The setting of the sample vessel 32 may be performed standing, or while controlling a personal computer (PC) placed to the right of the device. To perform this operation, the sample vessel 32 is placed immediately beneath the peristaltic pump 31, which is extremely easy.

Figure 3:
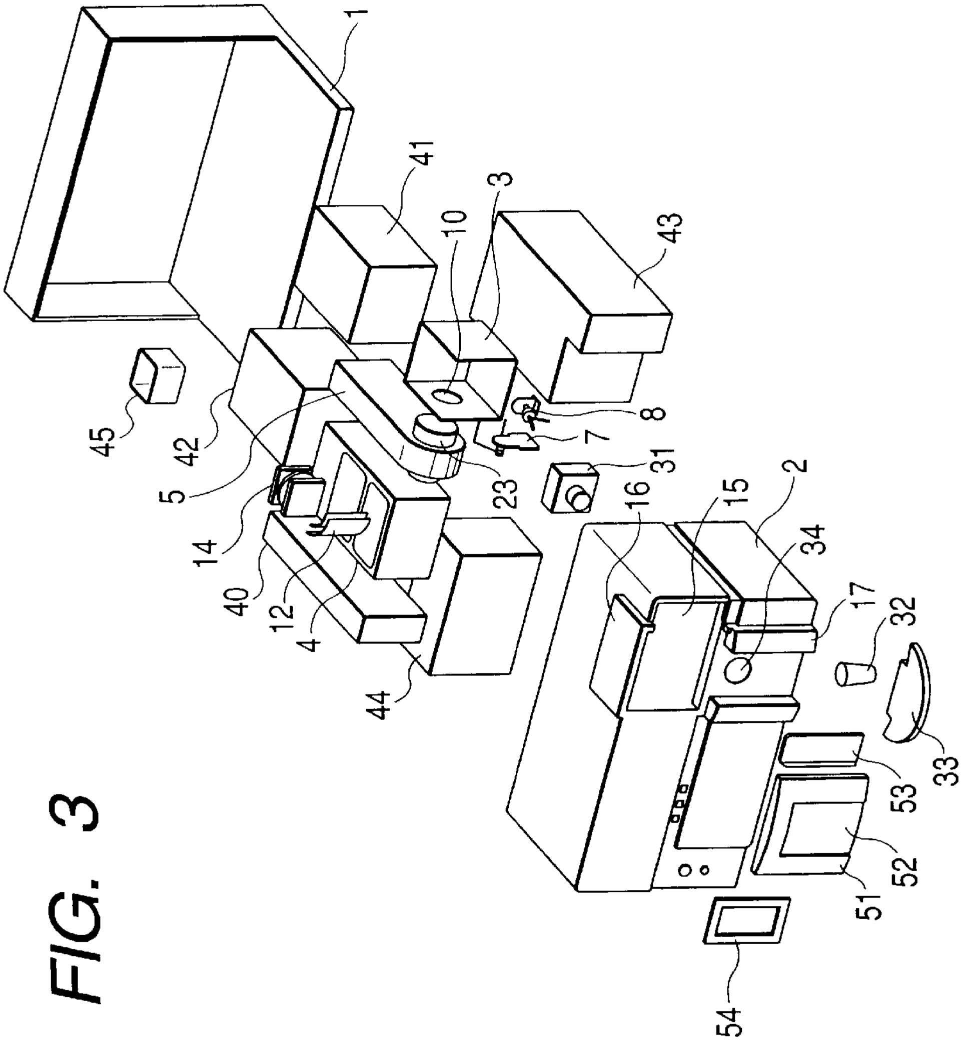
FIG. 3 is a schematic view of parts of the embodiment.

The circular metal part forming the interface portion 23 is in the vicinity of the flame of the torch 7 (7000 to 8000K), and therefore becomes carbonized and contaminated. This contamination affects analytical precision, so brushing must be performed with a metal brush before starting analysis. This metal part, i.e. the interface portion 23, can be removed for cleaning via the opened part 15. The opened part 15 is formed on the control side, i.e., on the front side as shown in FIG. 3, so the combustion state can also be verified through it.

The check window 52 is placed in the upper layer of the basis, and facilitates checking of the combustion, and maintenance or cleaning in the burner box 3. It also facilitates operations with tube connectors. Tubes are generally replaced at a rate of once every two weeks. Under normal conditions of use, maintenance or cleaning is usually performed at least once. As acid samples are used in the burner box 3, the interior becomes very contaminated. Cleaning is therefore an important operation, and it can be performed easily due to the provision of the opened part 15. When these operations are performed, the right-hand door 53 is opened and closed. The left-hand door 51 is opened for each analysis. These two doors have different purposes, and used to different degrees for frequent operations or not so frequent operations.

The peristaltic pump 31, which is partly arranged inside the basis, and partly arranged outside the basis, is installed in an opening 34 for a pump formed in the basis. Metal parts such as shafts should preferably be disposed outside the basis. This is because if they were inserted in the burner 6, there would be a risk of corrosion due to the acid of the solvent in the sample.

The reason why tube fittings are made to project as shown in the figures is to provide easy access and use, and because the sample path is shorter which means a shorter liquid transport time, i.e., it is advantageous for reducing analysis time.

The RF power supply 43 is installed underneath the burner box 3, and the matching box 41 is installed to the rear. As a result, the burner box 3 can be placed in the upper layer, and the box 3 may be moved to the right by a drive device, not shown, of the matching box 41 when the area around the interface portion 23 is cleaned.

Further, when measurements are taken of the combustion unit, this can be done in the optimum position. The burner box 3 is open on its control side (front side) and other side, and the chimney 45 is formed in the basis at a corresponding position. This opened part is provided when maintenance work is carried out. When maintenance work is performed, the front side and upper side are open to ensure visibility.

This mass spectrometer can be installed on a desktop. The height of the experiment table is usually 800 to 900 mm, it is preferable that the front side is open for an operator of height approximately 1600 mm, and if the operator is taller, it is an advantage if the upper side is open. The interface portion 23, nebulizer 8 and torch 7 are replaced and the burner box 3 is cleaned via the opened part provided in the burner box 3 and the opened part 15 provided in the basis.

A double construction is adopted comprising the inner box 3 and outer basis. These structures are opened by the left-hand door 51 and right-hand door 53.

The plasma obtained by burning the sample with the torch 7 attains 7000 to 8000K, and generates high frequency. A double shield is used to eliminate the effect of this high frequency. Also, acid samples are introduced into the burner box 3 as described above, so the interior of the burner box 3 is subject to an oxidation action. By making the burner 6 the inner burner box 3, oxidation can be suppressed in the inner box.

The interface portion 23 is a detachable metal part which is fixed between the slide valve box 5 and burner box 3, as stated above. It has an aperture in its center, and the plasma is introduced via the aperture. The interface portion 23 is easily contaminated so it must be removed for cleaning. When the left-hand door 51 is opened, the interface portion 23 is visible and can be immediately removed. This operation can be performed by opening the left-hand door 51. The left-hand door 51 is opened during the normal operation of replacing or cleaning the interface portion. An inner door 54 is provided to seal the burner box 3. The two doors are opened during maintenance work such as once a month or once every two weeks.

The device has a horizontal width of 1100 to 1150 mm for compactness. If the experiment table has a width of 1800 mm, about 600 mm space remains on the experiment table which allows installation of a personal computer (PC) on the table. In this case, the PC may be installed to the right.

The sample vessel 32 is placed to the right as described above, and operation is facilitated by installing the PC to the right of this.

Next, the flow of operations will be described.

First, power is switched ON to boot the PC. Several tens of the sample vessels 32 are arranged in front of the device. Before introducing a sample, a test is performed by aspirating water with the peristaltic pump 31.

Next, the sample vessel 32 is placed on the tray 33, the tube is connected to the sample, locked to the peristaltic pump 31, and the peristaltic pump 31 is started to send the sample to the torch 7 via the nebulizer 8 and convert it to a plasma. The sample vessel 32 (tray 33), peristaltic pump 31 and combustion parts are disposed substantially vertically in a straight line, so the tube path is shortened. As a result, less time is required to send the sample, and sample analysis time is decreased. It is preferable to form the left-hand door 51 and right-hand door 53 in a shape projecting from the front of the basis, as shown in the figures, so that the seal surface of the outer door can be closely fitted to the surface of the basis and high frequencies can be shielded.

FIG. 7 shows the external appearance of the completed device.

In the figure, a power switch 61, power lamp 62, plasma switch 63, emergency stop switch 64, gas meter 65 and gas adjusting dial 66 are provided on the outer surface of the front cover 2. The functions and methods of controlling these components are well known in the art and will not be described here.

Figure 8:
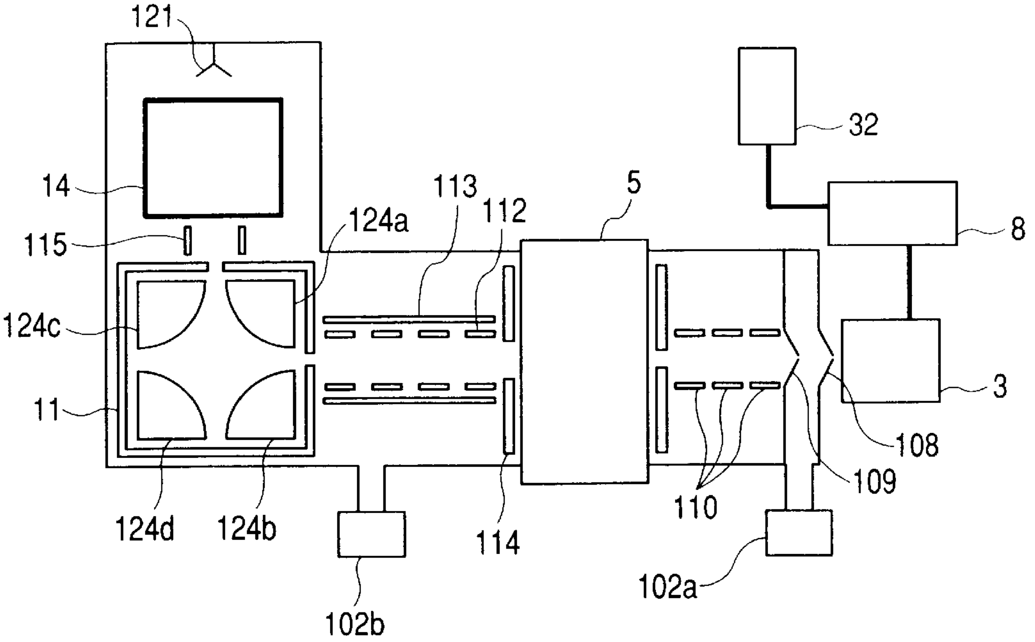
FIG. 8 is a drawing showing the internal structure of the embodiment in further detail.

FIG. 8 is a drawing showing the internal construction in more detail in the planar section shown in FIG. 4.

According to this invention, there are basically two electrodes (current electrodes) in the deflecting portion, however in FIG. 8, a construction using a quadrupole electrode deflector is shown for reference.

Ions relating to the sample substance are introduced to a high vacuum portion via apertures provided in the electrodes 108, 109 and a differential pumping region evacuated by a vacuum pumping system 102*a*. Evacuation of the high vacuum portion is performed by a vacuum pump 102*b*. The electrodes 108, 109 are connected to power supplies, not shown, so as to apply a voltage. The electrodes 108, 109 may be at the same potential. Ions introduced into the high vacuum portion are converged by an Einzel lens 110, and pass through a slit electrode 111 having a small opening. Most of the liquid drops which were not completely vaporized in the plasma are eliminated by the slit electrode 111.

For daily cleaning, the slide valve is closed, and the plasma side disassembled starting from the slide valve. Dirt adheres mainly to the electrodes 108, 109 with fine holes and the slit electrode 111, so cleaning can be performed very conveniently by cleaning this portion. By providing the slide valve, the device can be cleaned while the high vacuum portion comprising the mass analyzer is still under vacuum, so the time required to restart measurement is reduced.

The ion beam which has passed through the slit electrode 111 diverges when it passes through the slide valve box, but when it impinges on an electrostatic ion guide having a double envelope construction formed by an inner cylindrical electrode 112 having an opened part and an outer cylindrical electrode 113 disposed outside, it is reconverged.

The slide valve is usually electrically grounded.

A shield 114 is provided between the slide valve and the electrostatic ion guide so as to avoid any effect on the electric field of the electrostatic ion guide.

Ions which have passed through the electrostatic ion guide are introduced into the deflecting portion 11, where their orbit is deflected. In the deflector portion, various electrode arrangements are possible, for example a quadrupole deflector may be used comprising deflector electrodes 124*a*, 124*b*, 124*c* and 124*d*.

The deflected ions are converged by an ion optical system, for example comprising a lens electrode 115, and are then sent to the analyzer 14 where they are analyzed.

Although not shown in the figures, a predetermined voltage is applied using a power source or the like to the electrodes comprising the Einzel lens 110 and other electrodes in the device.

Figure 9:
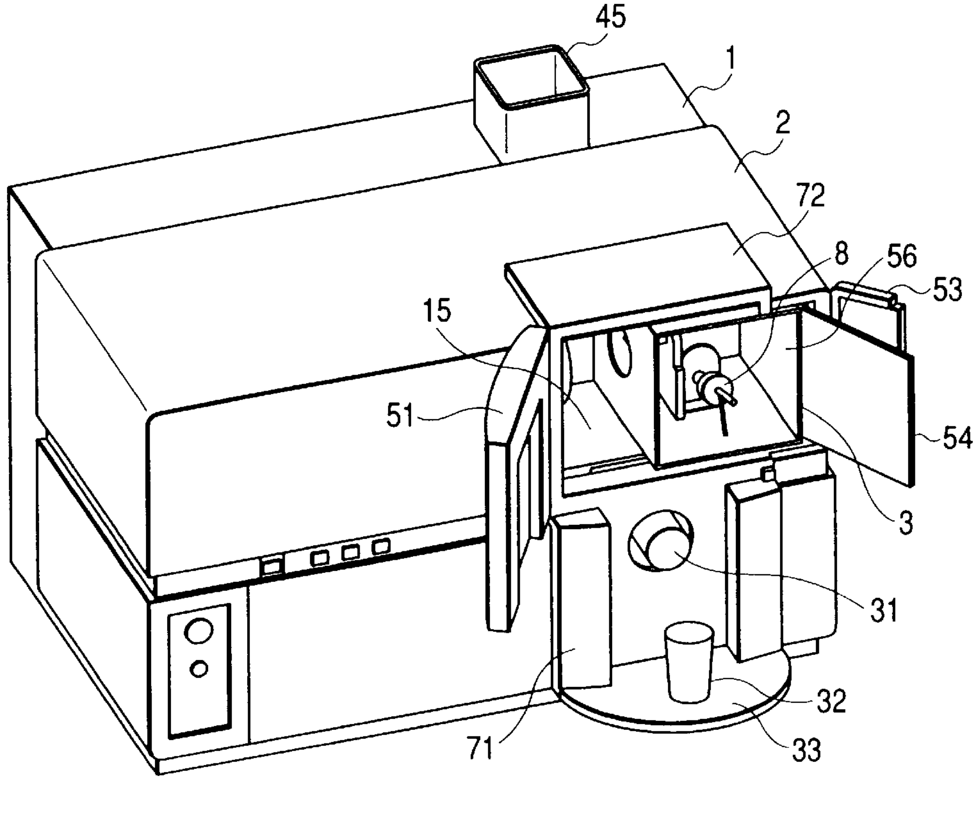
FIG. 9 is a drawing for mainly describing a door portion in the embodiment.

FIG. 9 is a drawing showing the relation between the outer door and inner door. A front opened part 56 of the burner box 3 is sealed by an inner door 55.

The opened part 15 directly faces the front opened part 56 and interface portion 23, so replacement and cleaning of parts can easily be performed.

Figure 10:
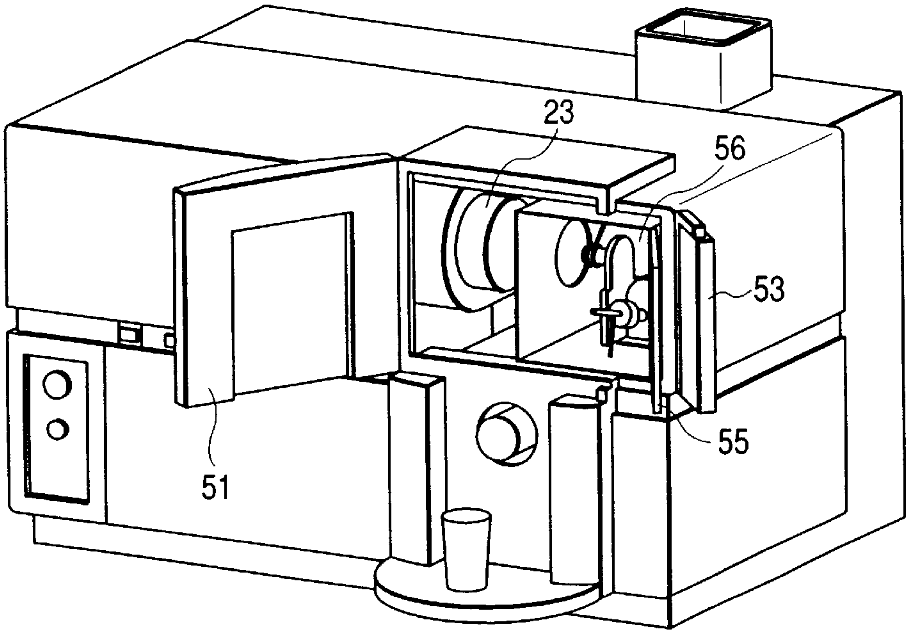
FIG. 10 is a view seen from another side of FIG. 9.

FIG. 10 is a view from another side, and will not be described again.

Figure 11:
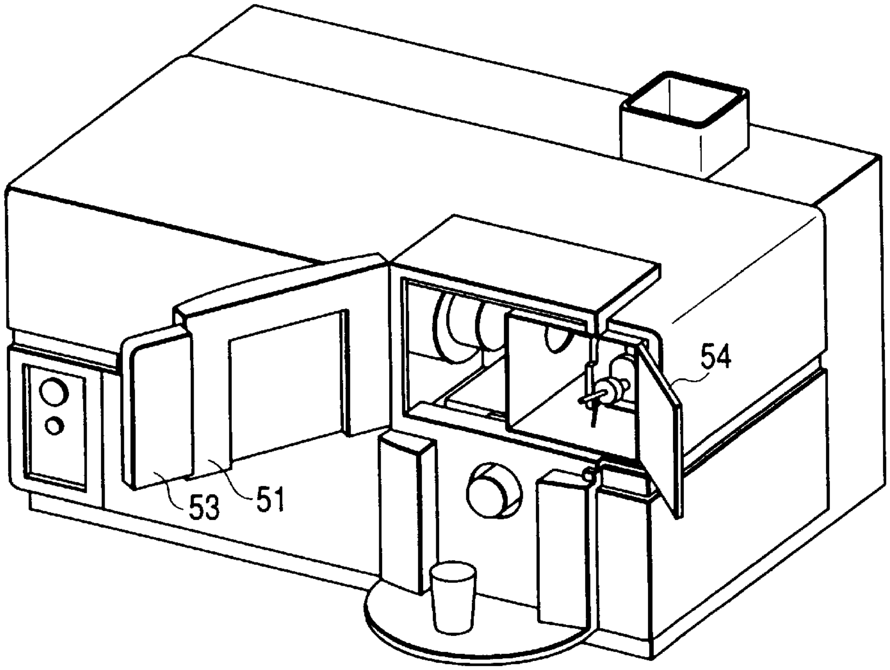
FIG. 11 is a view of another embodiment relating to FIG. 9.

FIG. 11 is a schematic view when the right-hand outer door 53 is connected to the left-hand outer door 51. In the above embodiment, the outer door comprised two doors, but it may comprise only one outer door to prevent leakage of high frequencies generated in the burner box 3. If the outer door comprises only one door it is not split, and is therefore easy to manufacture.

Figure 12:
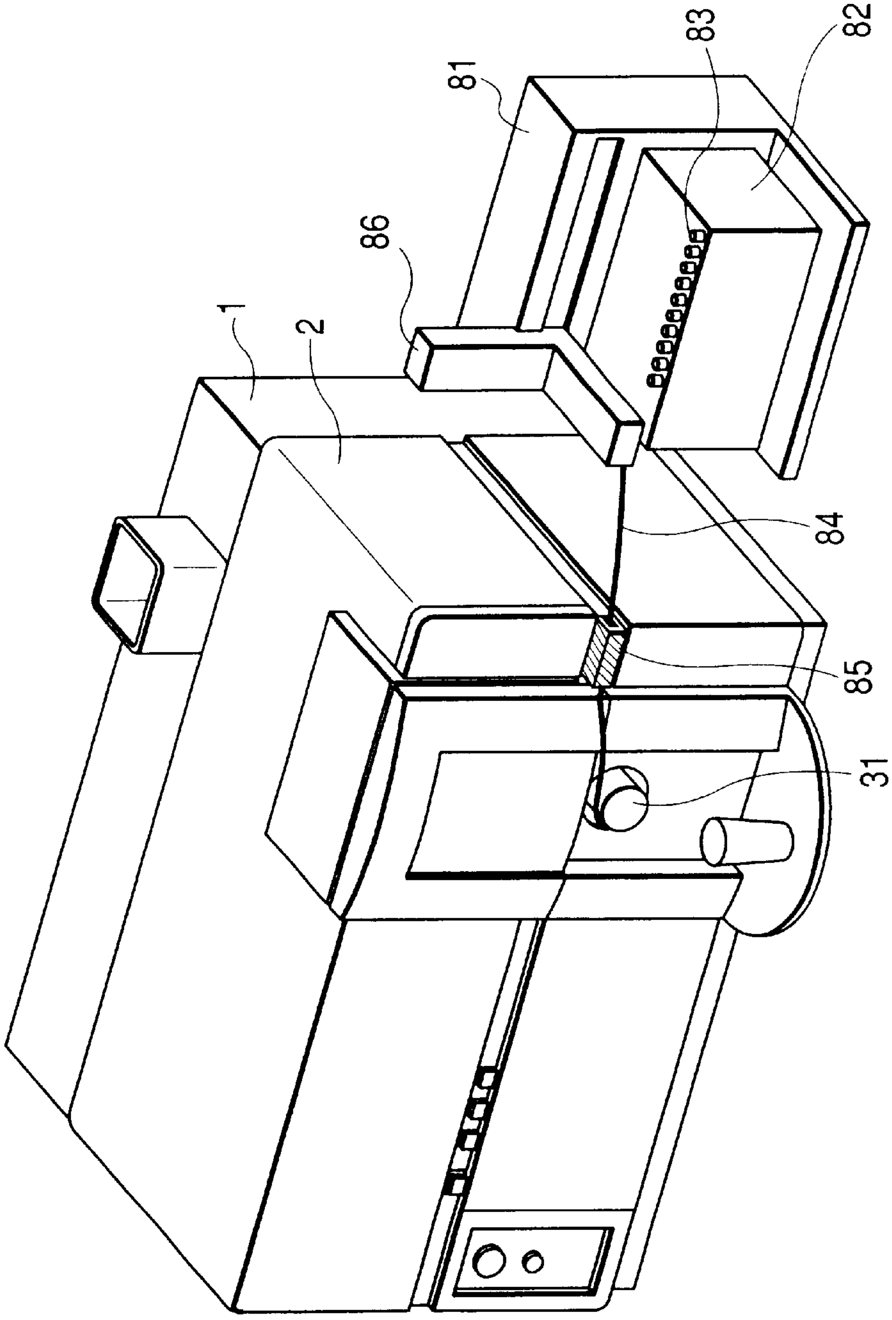
FIG. 12 is a schematic view showing a modification of the embodiment.

FIG. 12 shows an example where a detached sample stand 81 such as an autosampler is disposed to the right of the device. The detached sample stand 81 comprises a sample storage box 82, and plural sample holders 83 inside. A tube 84 is supported by a tube stopper provided in the front cover 2, and its end which is supported by a tube supporting member 56 is positioned above the sample holders 83. The other end is wound on the peristaltic pump 31, and is connected to the nebulizer 8 of the burner 6. The end of the tube 84 is immersed in the sample, and the sample is aspirated by the peristaltic pump 31 and sent to the nebulizer 8 and torch 7, where it is converted to a plasma and generates ions as in the aforesaid embodiment.

In the first embodiment of the invention described above, the characteristic feature from the viewpoint of sample introduction was that the path the sample follows during the analysis has, broadly speaking, two bends (sample flows 20, 24). In other words, from the operator s viewpoint, the sample which is supplied from the sample vessel 32 first ascends from bottom to top to be introduced into the burner box 3, as shown in FIG. 1, FIG. 2. The sample ionized in the burner box 3 travels in a horizontal direction, and is introduced into the deflector and analyzer box 4.

Next, the sample ions are guided by the parallel electrodes 12 to the analyzer 14 disposed at the rear when viewed from the operator's position. Hence, when the sample introducing path is disposed along the three-dimensional coordinate axes of the device (length, breadth, height), the size of the device overall is basically specified by this sample introducing path.

When the external shape of the device is approximately a rectangular parallelepiped or a cube as in the case of this embodiment (e.g., FIG. 7), it is desirable that the bending angles of the sample introducing path are respectively approximately 90 degrees. In this case, the sample introducing path has a contour lying along the rectangular coordinates (x, y, z) forming the device.

As space is created in positions which do not interfere with the sample introducing path, i.e., at the rear of the burner box 3, or underneath the deflector and analyzer box 4, the power supply, device control circuits or the vacuum pump, etc., may be installed in these positions (in the example of FIG. 3, the RF power supply 43 or electronics 44).

As a result, the whole device can be made compact while preserving superior performance features with regard to controllability and detection sensitivity.

According to this invention, a slide valve was used to decrease the restarting time during cleaning, however if it is desired to reduce the installation area to the minimum possible for use in a clean room, etc., the slide valve may be omitted to make the device more compact.

Embodiment 2

A second embodiment where the installation area of the device is further reduced will now be described referring to FIG. 13 to FIG. 16.

Figure 13:
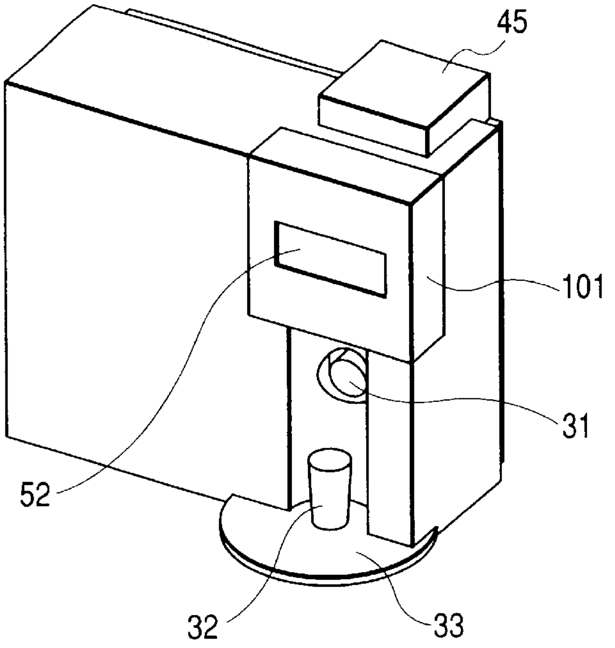
FIG. 13 is an external view showing a second embodiment of this invention.
Figure 14:
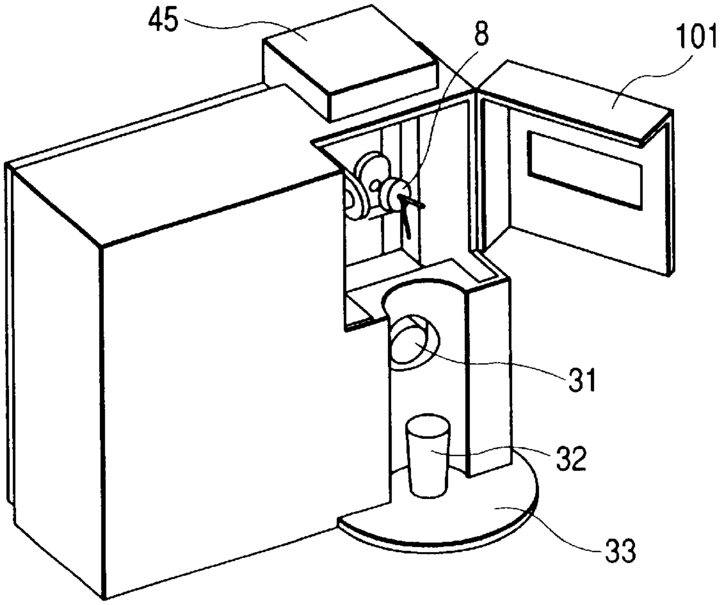
FIG. 14 is an external view showing a burner cover in FIG. 13 in an open state.
Figure 15:
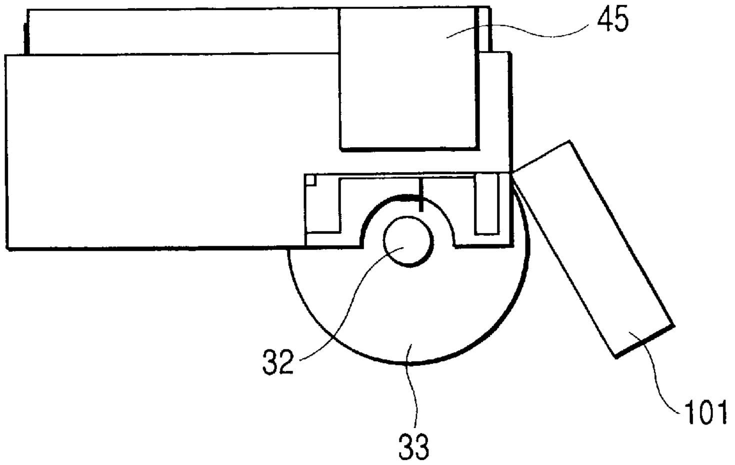
FIG. 15 is a view of FIG. 14 seen from above.
Figure 16:
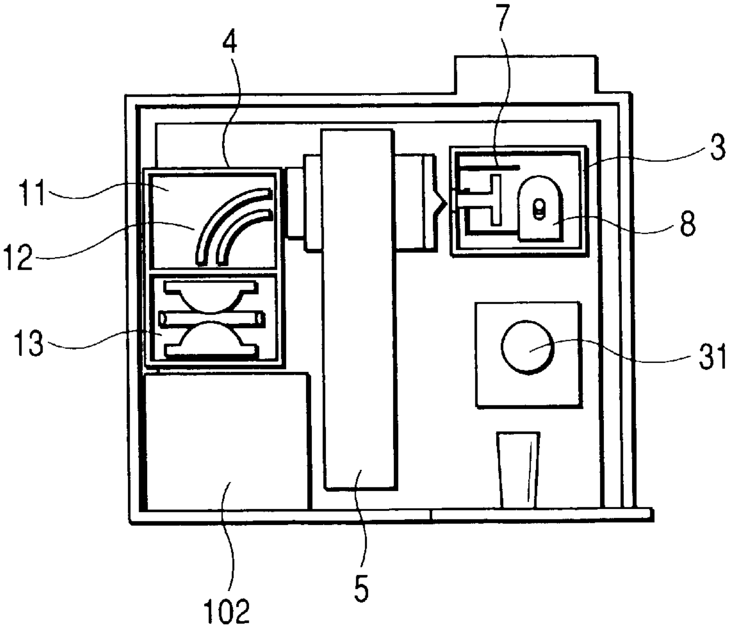
FIG. 16 is a drawing showing the internal construction of the embodiment.

FIG. 13 is an external view of the device, FIG. 14 is an external view showing the burner cover 101 open, FIG. 15 is a view of the device seen from above, and FIG. 16 is a drawing of the internal layout of the device from the operator's side.

As shown in FIG. 16, the burner box 3, peristaltic pump 31 and sample vessel 32, and the sample portion comprising the tray 33, are arranged in sequence on the right of the device. The burner box 3 is provided with the torch 7 and nebulizer 8. The deflector and analyzer box 4 has two interconnected chambers, the parallel electrodes 12 being disposed in one of these deflector chambers and the analyzer 14 being disposed in the other deflector room 13. The slide valve box 5 is disposed between the burner box 3 and the deflector and analyzer box 4. The arrangement of the sample vessel 32 and torch 7, etc., is identical to that of the first embodiment, and will not therefore be described in detail here. The front part and upper part of the burner are open. The chimney 45 is provided in alignment with the upper opening, burnt exhaust gas being discharged to the outside from this chimney 45. The burner cover 101 which has a check window 52 and can be opened or closed, is attached to the front opening. The peristaltic pump 31 aspirates sample from the sample vessel 32 via a tube, and supplies it to the nebulizer 8 situated directly above. The sample supplied to the nebulizer 8 is introduced into the plasma generated by the torch 7, and is ionized by the thermal action of the plasma. The ionized sample is then sent to the slide valve box 5 via the interface portion 23 comprising the sampling cone, differential pumping region and skimmer cone, not shown. The slide valve is disposed in the slide valve box 5, and the slide valve is driven according to the operating state of the device. Specifically, when an analysis is performed, the slide valve is opened, sample ions are sent to the parallel electrodes 12 via the slide valve box 5, and here they are deflected and sent to the analyzer room 13.

A vacuum pump 102 is disposed underneath the deflector and analyzer box 4.

The deflecting portion 11 comprising the deflecting electrodes (parallel electrodes 12) which deflect the ions and the analysis room 13 for performing a mass separation of the deflected ions, are disposed in the vertical direction (height direction).

The ions are deflected downward by the deflecting portion 11, and are introduced into the analysis room 13.

According to this embodiment, as in the case of the aforesaid first embodiment, the path the sample follows during the analysis has, broadly speaking, two bends. In other words, when viewed from the operator's position, the sample supplied from the sample vessel 32 first travels upwards from bottom to top and is introduced to the burner box 3, as is seen from FIG. 16. The sample which is ionized in the burner box 3 then travels horizontally, and is introduced to the deflector and analyzer box 4.

Next, viewed from the operator's position, the sample ions are deflected downward by the deflecting electrodes 12, and led into the analyzer 14. Hence, the sample path is U-shaped.

By arranging the sample path to follow (1) the height direction, (2) vertical direction and (3) height direction, a highly compact device with high performance can be manufactured.

From the operator's position, the sample path is longer in the height direction than in the first embodiment of this invention, but the vertical direction (depth direction) can be suitably shortened, so installation space is reduced.

From the operator's position, the power supply and control circuits may be installed to the rear, i.e., on the far side of the sample introducing path.

Also in the aforesaid second embodiment, if it is desired to reduce installation space as far as possible, the slide valve may be omitted to make the device even more compact.

Embodiment 3

A third embodiment of this invention will now be described referring to FIG. 17 to FIG. 19.

Figure 17:
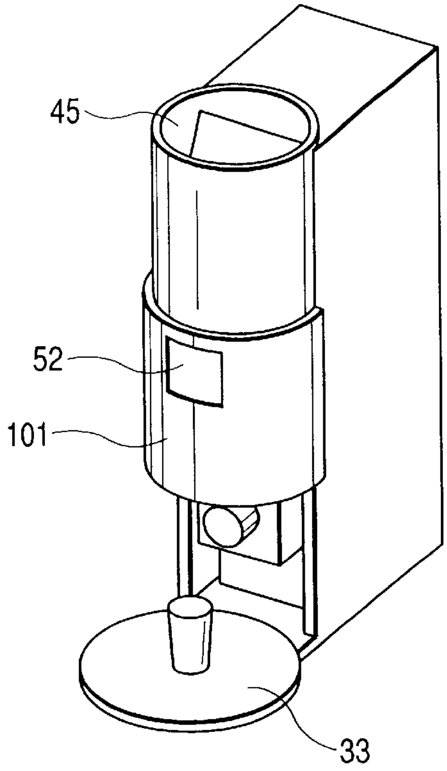
FIG. 17 is a drawing showing a third embodiment of this invention.
Figure 18:
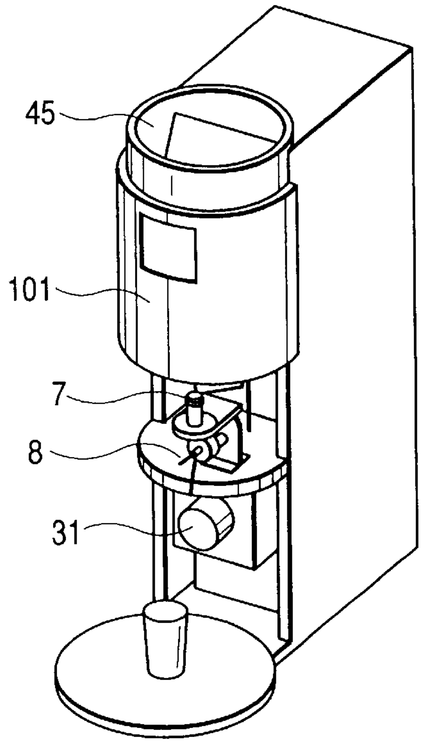
FIG. 18 is a drawing showing a state where the burner cover in FIG. 17 is slid upwards.
Figure 19:
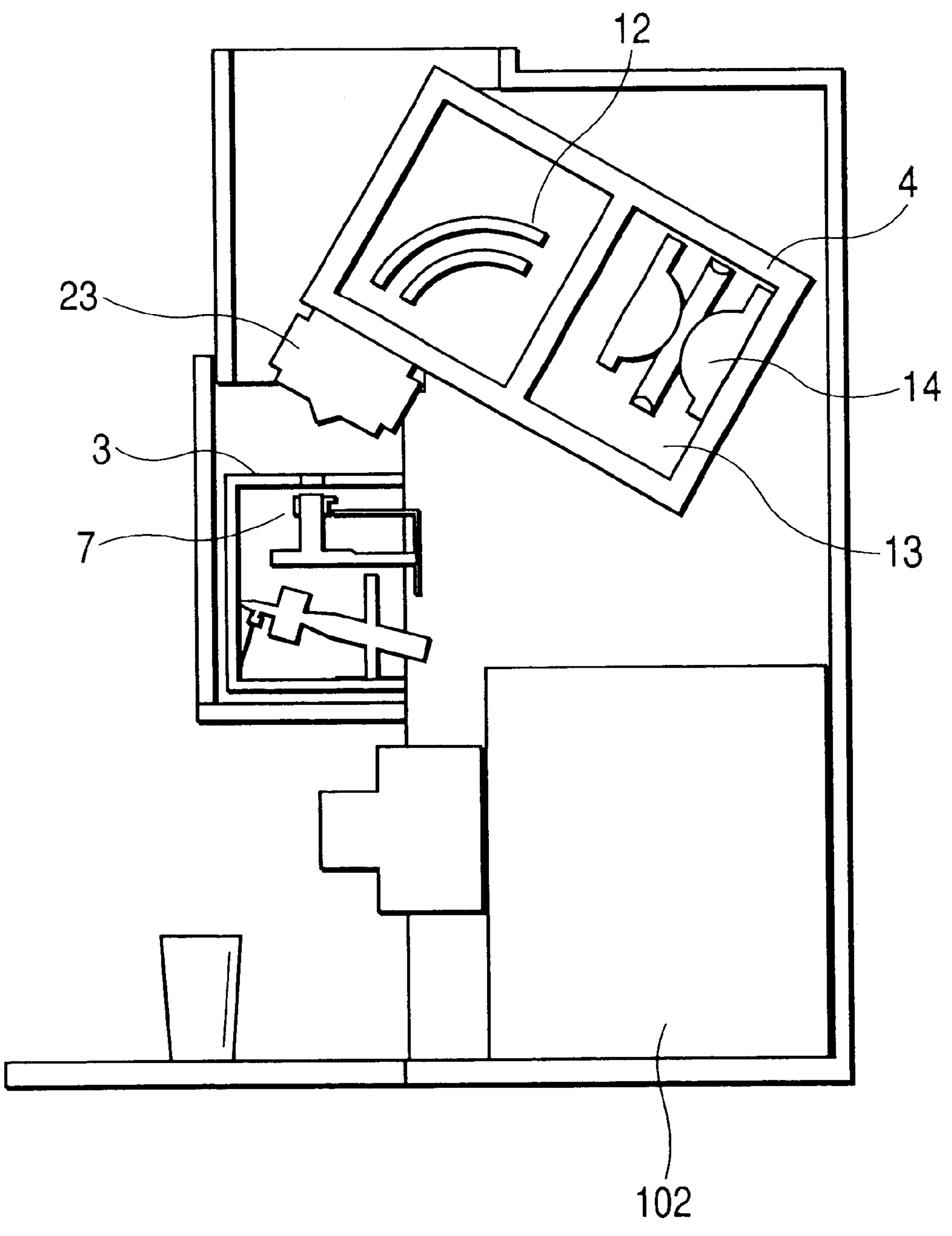
FIG. 19 is a drawing showing the internal construction of the third embodiment of this invention seen from the side.

FIG. 17 is an external view of the device, FIG. 18 is an external view wherein the burner cover 101 is slid upwards, and FIG. 19 is a view from the side of the device to reveal the internal construction.

As shown in FIG. 18, from the operator's position, the burner box 3, peristaltic pump 31 and sample parts comprising the sampling vessel 32 and tray 33, are arranged vertically in sequence.

The burner container comprises the torch 7 and nebulizer 8. Another characteristic feature is that the torch 7 is arranged facing upwards.

As shown in FIG. 18, during maintenance or cleaning, the burner cover 101 is slid upwards along the outer circumference of the chimney 45. Due to this construction, work can be carried out on the torch 7 or interface portion from the front or from any direction to the left and right, which is very convenient.

The ionized sample is introduced in the deflector and analyzer box 4 via the interface portion 23 attached to the upper part of the torch 7, as shown in FIG. 19. In this operation, the interface portion 23 may be installed slightly inclined relative to the burner box to allow hot gases from the plasma to flow easily through the chimney 45, as shown in FIG. 19.

The sample supplied by the nebulizer 8 is introduced in the plasma generated by the torch 7, and ionized by the thermal action of the plasma.

The ionized sample is sent to the deflection electrodes 12 via the interface portion 23 comprising the sampling cone, differential pumping region and skimmer cone, not shown. Here, it is deflected and sent to the analysis room 13.

According to this embodiment, the path followed by the sample during analysis has, broadly speaking, one bend. In other words, seen from the operator's position, the sample supplied from the sample vessel 32 first travels from bottom to top and is introduced to the burner box 3, as shown in FIG. 19. The sample ionized in the burner box 3 is then introduced to the deflector and analyzer box 4 via the interface portion 32 which is provided at a higher position than the burner box 3.

Next, as seen from the operator's position, the sample ions are deflected toward the rear of the device by the parallel electrodes 12, and introduced to the analyzer 14. Therefore, the sample path is (1) in the height direction, and (2) in the depth direction.

By disposing components from the sample vessel to the deflection portion (parallel electrodes) in one direction, the device becomes longer in the height direction than in the aforesaid first embodiment or second embodiment, but installation space for the device is greatly reduced.

Figure 20:
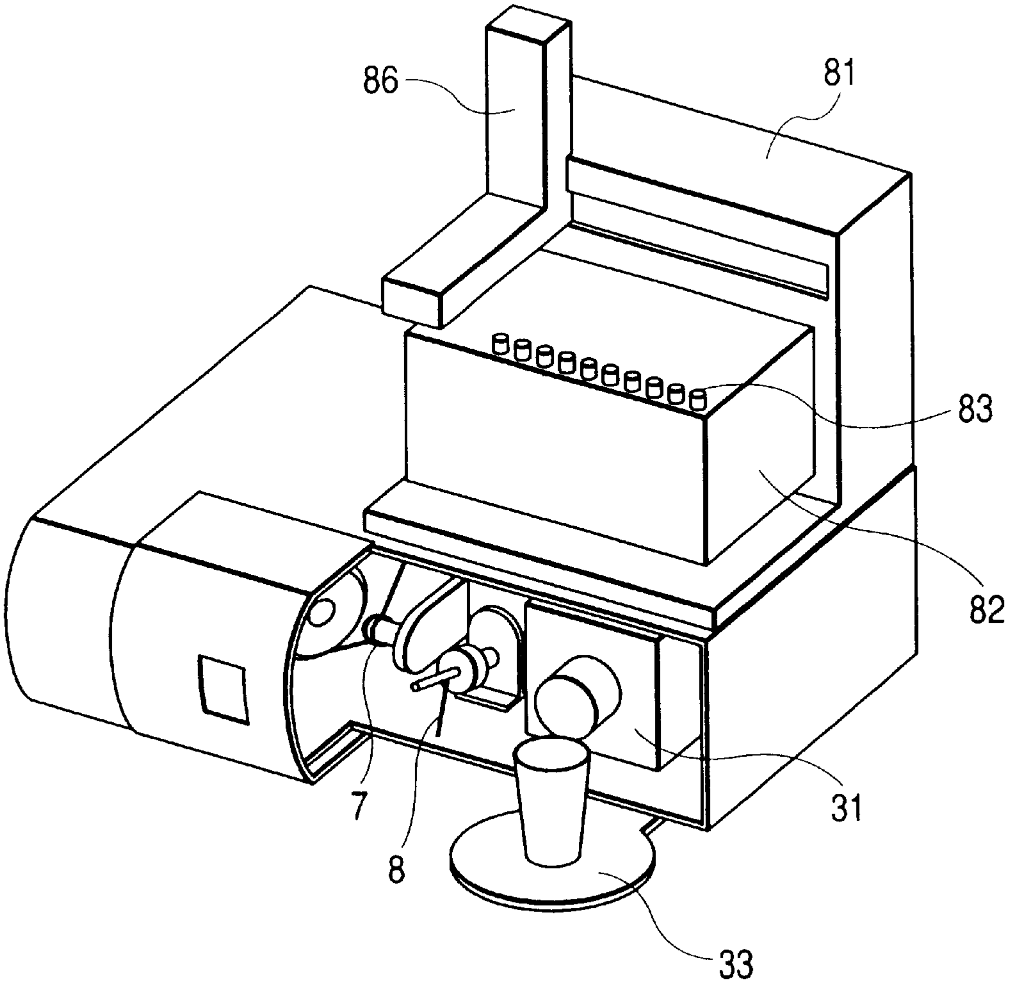
FIG. 20 is a drawing showing the device on its side with an autosampler on the upper part.

According to the second and third embodiments of this invention, the width of the device from the operator's position is shorter. As a result, a data processing unit such as a personal computer can easily be installed next to the device. As parts to be monitored during measurements, e.g. sample containers, the peristaltic pump and monitors such as the check window or data processing unit can be installed in close proximity, monitoring of the device is extremely easy. Further, according to the second and third embodiment of this invention the device can also be used on its side. In this case, an autosampler or the like can be placed on the device. For reference, FIG. 20 shows the case where, in the third embodiment of this invention, the device is laid on its side, and the detached sample stand 81 is arranged on top of the plasma ion source mass spectrometer.

Hence, according to this invention, depending on the type of analytical instruments used and the size of the laboratory, etc., the plasma ion source mass spectrometer can be laid on its side if so required by the operator, and experiment space can therefore be used efficiently.

Embodiment 4

In the plasma ion source mass spectrometer, various techniques are used to prevent photons from the plasma from reaching the detector in order to achieve high sensitivity detection. Apart from the type which deflects the ion orbit by a deflecting portion as described heretofore, there is also a type wherein the interface portion and analyzer are disposed in different positions, and a type whether photons are blocked using a so-called photon stopper.

A feature of this invention is that the plasma ion generating means, deflecting means and ionizing means used for analysis are arranged on a plane in the horizontal direction, the means for supplying the sample to the plasma ion generating means is arranged on a plane in the vertical direction, a two-tier structure being adopted wherein the former are disposed in an upper layer and the latter is arranged in a lower layer. In this way, a compact, easy-to-use device can be provided wherein the sample is introduced in a shorter distance, and soiling is prevented during introduction of the sample.

Thus, this invention may be applied in the same way to a plasma ion source mass spectrometer of different type.

Figure 21:
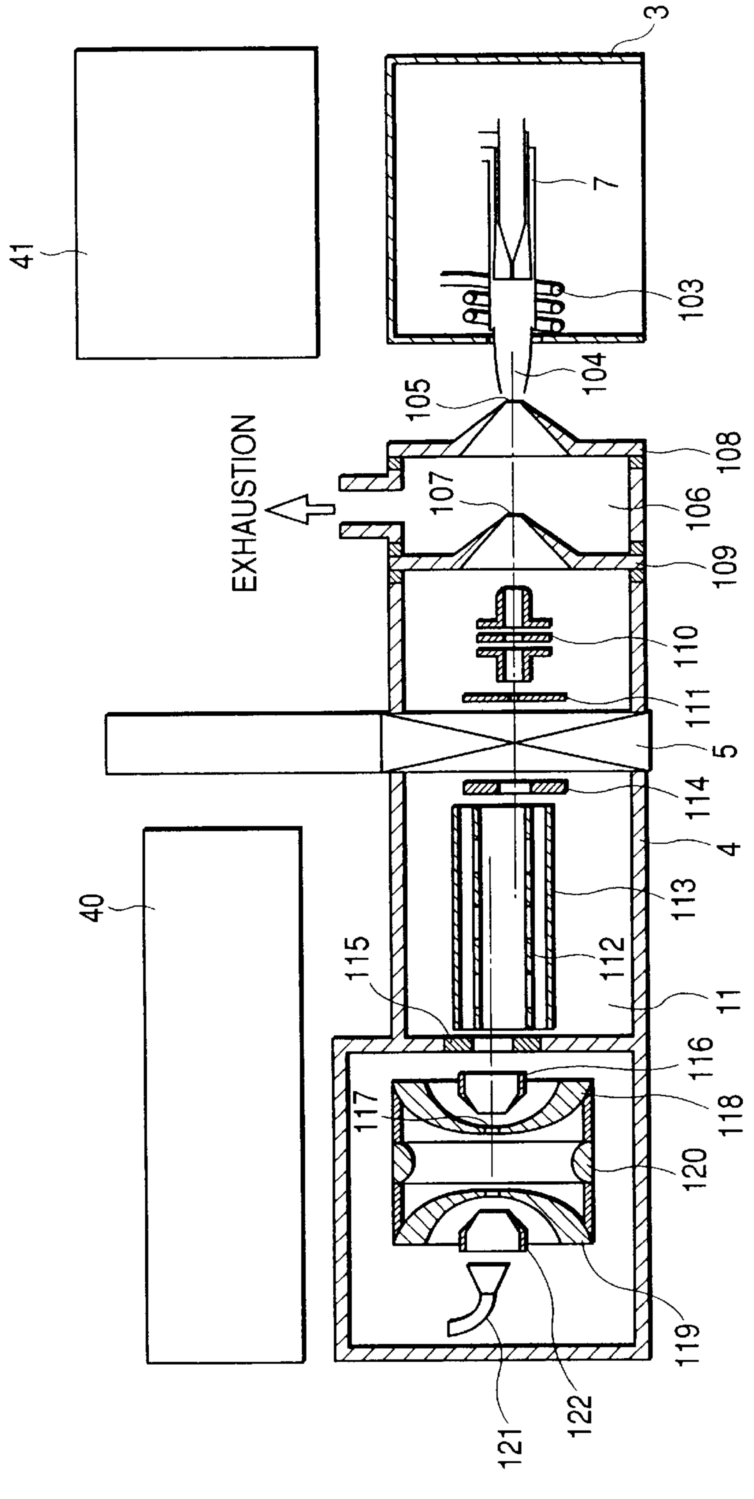
FIG. 21 is a drawing showing a fourth embodiment of this invention.

As a reference, a construction wherein the interface portion and analyzer are in different positions will be described using FIG. 21 as a fourth embodiment of this invention.

Part of the vertical surface 22 in FIG. 2 is the same as that of the first embodiment and is therefore omitted. FIG. 21 shows a cross-sectional view of a part corresponding to the horizontal surface 21 of FIG. 1.

The ICP torch 7 has a triple tube structure. A nebulizing gas is sent to the center part, and fine drops of a sample solution generated by the nebulizer are introduced. A plasma gas (mainly argon) for generating plasma is passed into an area surrounding the nebulizing gas. A sheath gas is also introduced into the area surrounding this for generating a predetermined air current and maintaining the plasma. An induction coil 103 is arranged on the outer circumference of the end of the torch 7, and high frequency power is supplied to this coil. Due to the alternating current magnetic field generated by the induction coil 103, an electric field is induced in the end of the torch 7, and due to this electric field, the plasma gas dissociates to generate a plasma 104. Liquid drops introduced into the plasma by the nebulizing gas are exposed to the high temperature of the plasma. The liquid drops vaporize in a short time, and substances contained in the liquid drops are atomized and ionized. Ions of the sample substance generated in this way are then taken into the high vacuum portion via the sampling cone 105, the differential pumping region 106 evacuated by an evacuation system, not shown, and the skimmer cone 107.

An exhaust port, not shown, is provided in part of the deflector and analyzer box 4, and vacuum pumping is performed by a turbo molecular pump, not shown, via this exhaust port. A power supply, not shown, for supplying a voltage is connected to the electrode 108 which opens into the sampling cone, and the electrode 109 which opens into the skimmer cone. The electrodes 108, 109 may be at the same potential.

Ions taken into the high vacuum portion are converged by the Einzel lens 110, and pass through the slit electrode 111 which has a small opening. Most of the liquid not vaporized completely in the plasma is removed by the slit electrode 111. During daily cleaning, the slide valve may be closed, and the plasma side disassembled starting from the slide valve to perform cleaning.

The ion beam which is passed through the slit electrode diverges when it passes through the slide valve container, but it impinges on the electrostatic ion guide having a double envelope structure comprising the inner cylindrical electrode 112 comprising an opening, and the outer cylindrical electrode 113 disposed outside the inner cylindrical electrode. The slide valve is usually electrically grounded.

The shield 114 is provided between the slide valve and the electrostatic ion guide so as not to have an effect on the electric field in the electrostatic ion guide part. By arranging the axis of the sampling cone 105 or skimmer cone 107 in a different position from the axis of the electrostatic ion guide, the ion orbit is deflected and separated from photon orbits which are not subject to the electric field. The ions which have passed through the electrostatic ion guide are converged by the lens electrode 115, sent to the analyzer via the gate electrode 116, and taken up by the analyzer via the ion introducing opening 117.

The analyzer comprises a pair of endcap electrodes 118, 119 and a ring electrode 120. The gate electrode 116 is provided to control the timing with which the ions impinge on the analyzer. Helium is supplied from a helium gas container, not shown, to the interior of the analyzer which is maintained at a pressure of approximately 1 milliTorr. The ions which impinge on the analyzer lose their energy when they collide with the helium gas, and are trapped by the ion introducing potential. The ions separated according to mass by the analyzer are extracted outside the analyzer, and detected by the detector 121. Apart from the stage when ion masses are analyzed, a high voltage is applied to an ion stopper electrode 122 to prevent stray ions from reaching the detector 121.

Although not shown in the figure, predetermined voltages are applied using the power supply to various electrodes forming the device including the electrode forming the Einzel lens 110.

It is well known that a construction allowing for high sensitivity measurements can be obtained by arranging the sampling cone or skimmer cone and ion introducing opening of the analyzer in different positions, and providing an ion orbit deflector between them to separate ion orbits from photon orbits which generate noise.

According to this embodiment, the electrostatic ion guide having a double cylinder structure was used as the deflector, but various types of deflector that control ion orbits using an electric field are known.

Embodiment 5

Apart from the method of separating ion orbits from photon orbits using a deflector as shown in the aforesaid first to fourth embodiments, there is another method which performs this separation inside the analyzer.

Figure 22:
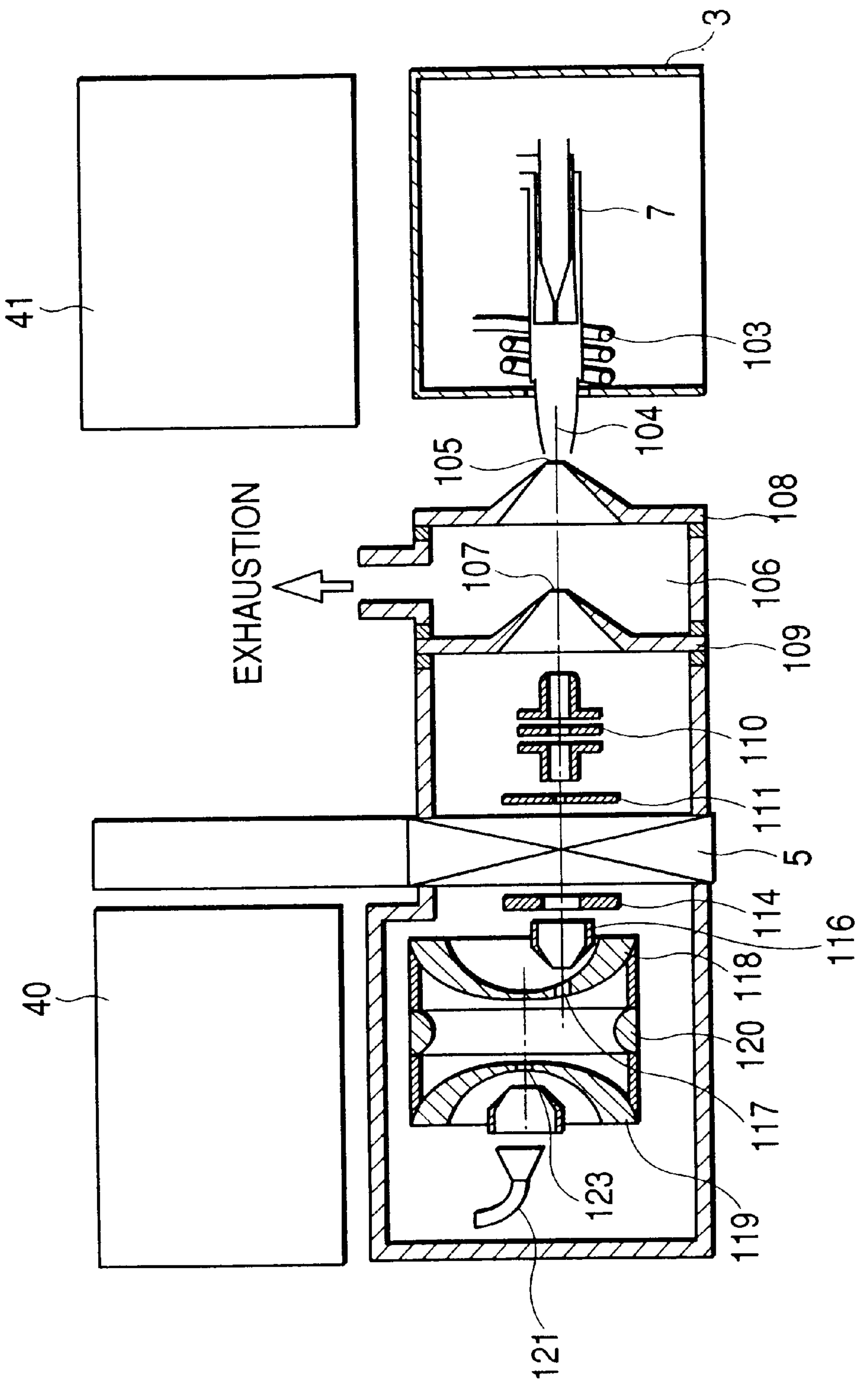
FIG. 22 is a drawing showing a fifth embodiment of this invention.

This fifth embodiment will be described using FIG. 22.

The ion introducing opening 117 of the analyzer is provided in a different position from the center of the endcap electrode 118. Ions introduced from the ion introducing opening 117 lose their energy by colliding with helium gas, and travel toward the center of the analyzer which is at a low ion introducing potential. The ions separated according to mass are then extracted from an opening 123 in another endcap electrode 119 provided in a facing position, and detected by the detector 121.

Photons travel in a straight line and strike the wall of the endcap electrode 119 on the opposite side, so they do not reach the detector 121.

According to this fifth embodiment, there is a slight disadvantage from the sensitivity viewpoint as the ion introducing efficiency of this device is lower than in the aforesaid first to fourth embodiments, but as a deflector is not used, the device can be made very compact.

By disposing components from the burner to the deflection and analysis box in a horizontal arrangement, and components from the sample setting part to the burner in a vertical arrangement, parts which are not often accessed can be disposed in a horizontal arrangement at the rear, whereas parts which must be accessed once or twice during analysis can be disposed on the control side in a vertical arrangement. The device can therefore be operated easily.

Further, by adopting a vertical arrangement, the operator can perform operations without moving, and monitoring devices and controls including the check window can be centrally disposed.

By forming the burner as an independent burner box, and leaving the front and upper sides of this box open, maintenance is easy, and by providing the check window in a seal door, the combustion state can easily be verified.

By providing the opened part corresponding to the basis, replacement and cleaning of parts including the interface portion can easily be performed.

Further, by forming the sample introducing path with two bends, a device requiring only a small installation surface area can easily be constructed.

Hence, a plasma ion source mass spectrometer which is compact and has high controllability, is provided by this invention.

What is claimed:

1. A plasma ion source mass spectrometer comprising:

a sample setting portion for setting a sample;

a peristaltic pump for aspirating the sample;

a nebulizer for generating liquid droplets of the sample;

an inductively coupled plasma torch for ionizing the sample in a plasma and for producing ions in the plasma into which the liquid droplets introduced by a nebulizing gas;

an ion trap mass spectrometer for performing mass separation of the ions, wherein the ion trap mass spectrometer comprises a pair of endcap electrodes and a ring electrode disposed between the pair of endcap electrodes, an ion inlet opening for introducing the ions into the ion trap mass spectrometer is formed at one endcap electrode at an ion inlet side in a different position from a center of the one endcap electrode, and an ion outlet opening for extracting the ions separated according to mass from the ion trap mass spectrometer is formed at another endcap electrode at an ion outlet side in a center of the other endcap electrode;

a gate electrode for sending the ions produced in the plasma to an ion trap mass spectrometer, wherein the gate electrode is disposed between the one endcap electrode and the inductively coupled plasma torch, and the gate electrode is provided to control a timing with which the ions are introduced into the ion trap mass spectrometer; and an ion detector for detecting the ions separated by and extracted from the ion trap mass spectrometer, wherein the ions produced in the plasma are introduced along an axis different from a central axis of the ion trap mass spectrometer, and separation of ions and photons is performed in the ion trap mass spectrometer, and the ions separated according to mass are extracted from the central axis of the ion trap mass spectrometer.

* * * * *